United States Patent
Toyooka et al.

(10) Patent No.: US 6,943,870 B2
(45) Date of Patent: Sep. 13, 2005

(54) DEFORMATION MEASURING METHOD AND APPARATUS USING ELECTRONIC SPECKLE PATTERN INTERFEROMETRY

(75) Inventors: Satoru Toyooka, Saitama (JP); Hirofumi Kadono, Tokorozawa (JP)

(73) Assignee: President of Saitama University, Saitama (JP)

(*) Notice: Subject to any disclaimer, the term of this patent is extended or adjusted under 35 U.S.C. 154(b) by 105 days.

(21) Appl. No.: 10/334,784

(22) Filed: Jan. 2, 2003

(65) Prior Publication Data

US 2004/0057054 A1 Mar. 25, 2004

(30) Foreign Application Priority Data

Sep. 20, 2002 (JP) ......................................... 2002-275775

(51) Int. Cl.[7] ................................................. G01B 9/02
(52) U.S. Cl. ....................... 356/35.5; 356/512; 356/521
(58) Field of Search ............................... 356/35.5, 521, 356/512, 450

(56) References Cited

U.S. PATENT DOCUMENTS

2004/0059526 A1 * 3/2004 Toyooka et al. .............. 702/57

FOREIGN PATENT DOCUMENTS

| JP | 60-39518 | 3/1985 |
|----|----------|--------|
| JP | 09-325016 | 12/1997 |
| JP | 2001-311613 | 11/2001 |
| WO | WO 96/04532 | 2/1996 |

OTHER PUBLICATIONS

Wong, W.O. et al., "Quantitative Vibration Amplitude measurement with Time–averaged Digital Speckle Pattern Interferometry", *Optics & Laser Technology*, 1998, pp. 317–324, vol. 30.

Agneni, A. et al., "Image Processing for Fringe Unwrapping in Speckle Interferometry", *Proceedings of the International Modal Analysis Conference*, 2000, pp. 1479–1484, vol. 2.

Joenathan, C. et al., "Speckle Interferometry with Temporal Phase Evaluation: Influence of Decorrelation, Speckle Size, and Nonlinearity of the Camera", *Applied Optics*, Mar. 1999, pp. 1169–1178, vol. 38, No. 7.

* cited by examiner

*Primary Examiner*—Andrew H. Lee
(74) *Attorney, Agent, or Firm*—Snider & Associates; Ronald R. Snider

(57) ABSTRACT

A deformation measuring method using electronic speckle pattern interferometry comprises the steps of subtracting an average intensity from the intensity in a time domain at each point of a speckle pattern image so as to compute the cosine component of intensity; subjecting the cosine component to Hilbert transform in a temporal domain so as to compute the sine component of intensity; determining the arctangent of the ratio between thus computed sine and cosine components so as to determine an object phase; carrying out an unwrapping operation; and outputting three-dimensional deformation distribution data in a displayable mode.

8 Claims, 11 Drawing Sheets

OUT-OF-PLANE DISPLACEMENT MEASUREMENT

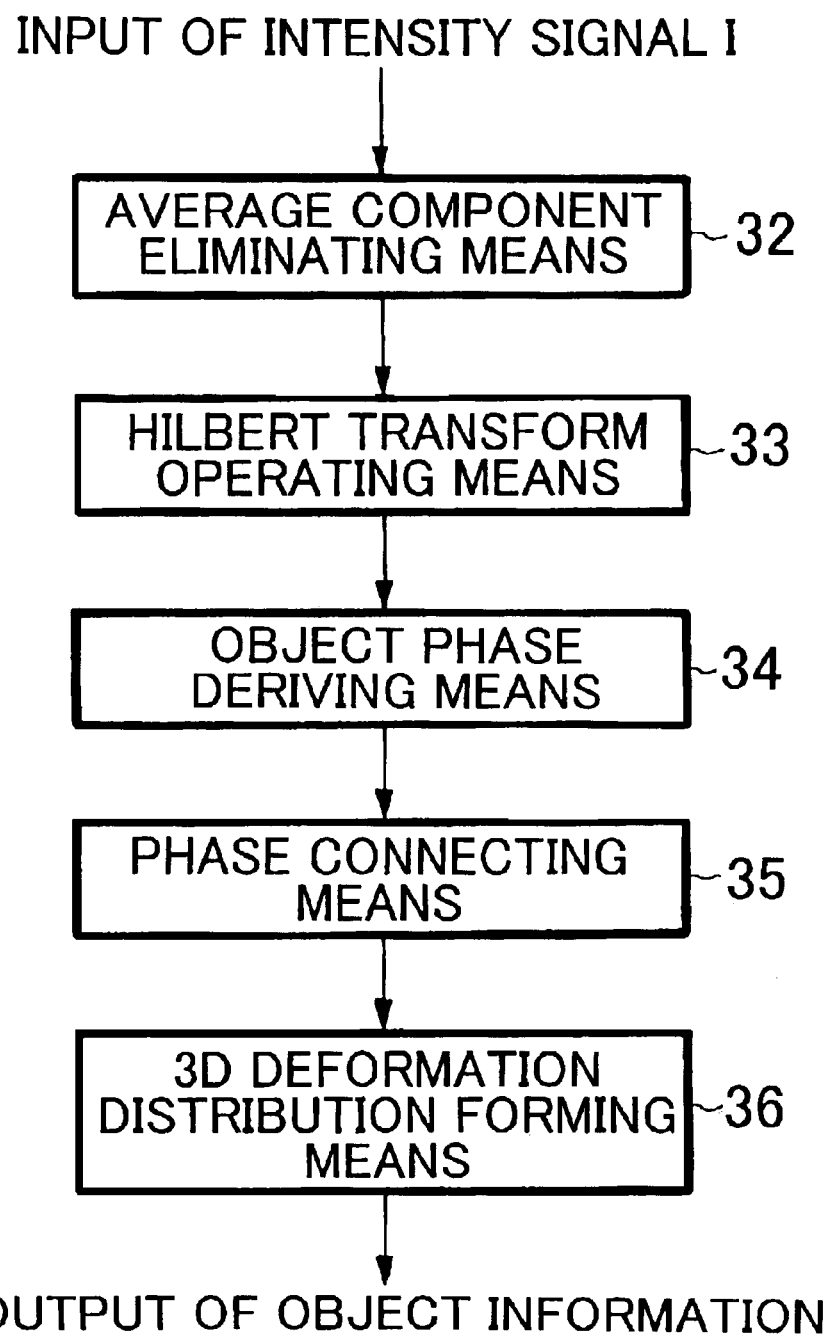

DEFORMATION MEASURING METHOD AND APPARATUS USING ELECTRONIC SPECKLE PATTERN INTERFEROMETRY

RELATED APPLICATIONS

This application claims the priority of Japanese Patent Application No. 2002-275775 filed on Sep. 20, 2002, which is incorporated herein by reference.

BACKGROUND OF THE INVENTION

1. Field of the Invention

The present invention relates to a deformation measuring method and apparatus using electronic speckle pattern interferometry; and, more specifically, to a deformation measuring method and apparatus using electronic speckle interferometry which can favorably perform phase unwrapping when analyzing temporal deformation of a dynamic object.

2. Description of the Prior Art

For measuring the surface shape and deformation of an object in a mirror surface condition by interferometry, demands for simply determining its phase distribution (corresponding to the surface shape) have been becoming very strong especially in the optical and electronic fields due to the advancement of technology in recent years. As techniques for determining the phase distribution of such an object to be observed in interferometric measurement in particular, those mainly using phase shifting and spatial Fourier transform (Fourier transform introducing therein a spatial carrier; ditto in the following) have conventionally been known.

In general, the phase-shifting method determines a phase distribution of an object according to pattern information of respective interference pattern images, whose phases are shifted from each other by a phase angle which is an integral fraction of $2\pi$, between object light and reference light in an interferometer. The intensity signal in a predetermined spatial domain obtained from N interference pattern images equally dividing $2\pi$ by N is given by the following expression (1):

$$I_i(x,y) = I_0[1 + \gamma \cos\{\phi(x,y) + 2\pi i/N\}] \; i = 0, 1, \ldots, (N-1) \quad (1)$$

where $\phi(x,y)$ is the phase to be determined. On the other hand, $I_0$ is the average intensity, and $\gamma$ is the visibility (modulation) of interference pattern, both of which are unknown quantities. In a simple example where N=4, $\phi(x,y)$ is determined by the following expression (2):

$$\phi(x, y) = \tan^{-1}\left(\frac{I_2 - I_4}{I_1 - I_3}\right) \quad (2)$$

The Fourier transform method will now be explained. When one of optical paths of an interferometer is tilted by a minute angle $\theta$ about the y axis, a spatial intensity distribution given by the following expression (3) is obtained:

$$I(x, y) = I_0[1 + \gamma\cos\{\phi(x, y) + 2\pi x \sin\theta/\lambda\}] \quad (3)$$
$$= I_0[1 + \gamma\cos\{\phi(x, y) + 2\pi f_0 x\}]$$

where $f_0 = \sin\theta/\lambda$ is the spatial frequency of carrier fringes generated by tilting the optical path. When the above-mentioned expression (3) is Fourier-transformed in the x direction, the following expression (4):

$$J(f, y) = \int_{-\infty}^{\infty} I(x, y)\exp(-j2\pi f x)dx \quad (4)$$
$$= J_0(f, y) + J_1(f + f_0, y) + J_1^*(f - f_0, y)$$

is obtained.

The right side of expression (4) indicates that the three terms can be separated from one another on the spatial frequency axis if $f_0$ is sufficiently large. When $f_0$ is made sufficiently large so as to take out the second term of the right side alone, whereas the other terms are cut by a filter, and the second term is shifted to the origin of the spatial frequency domain the following expression (5):

$$I_r = I_0 \gamma \exp[i\phi(x,y)] \quad (5)$$

is obtained.

From the ratio (arctangent) between the real part and imaginary part of the right side of expression (5), the following expression (6)

$$\phi(x, y) = \tan^{-1}\frac{\text{Im}[I_r]}{\text{Re}[I_r]} \quad (6)$$

is obtained.

In each of the two conventional methods mentioned above, the unknown quantity $\phi(x,y)$ to be determined is obtained independently of the other unknown quantities $I_0$ and $\gamma$. The phase value is determined as a principal value between $[-\pi, \pi]$. FIG. 8 shows how the phase is obtained according to expression (6) when the object phase linearly changes. The denominator and numerator in the above-mentioned expression (6) are cosine and sine functions, respectively, and the arctangent of their ratio yields a sawtooth phase distribution in which phase hopping occurs at intervals of $2\pi$. The phase-hopped positions are determined, and the phase value of $2\pi$ is added to (or subtracted from) data on the right side of each of these positions, so as to correct the phase hopping, whereby a phase distribution in proportion to the object shape can be obtained. This processing is known as phase unwrapping.

In the phase-shifting method, the phase of a point in a two-dimensional interference pattern can be analyzed from several intensity data obtained by phase shifting of this point in general. Therefore, this point will not be influenced by other points spatially different therefrom. In the Fourier transform method, by contrast, all the data on a line constituted by spatial carriers must be subjected to Fourier transform operations, whereby the phase of a point cannot be determined independently from other points.

On the other hand, the object to be observed must stand still throughout a period in which several phase-shifted interference pattern images are captured in the phase-shifting method. By contrast, the Fourier transform method is considered to be suitable for dynamic phenomena, since phase analysis can be carried out from a single interference pattern image only if a carrier component is made beforehand. In other words, the phase-shifting method requires the object to be temporally constant though spatial restrictions thereon are loose, whereas the Fourier transform method makes it necessary for the object to have a phase distribution which is spatially moderate enough as compared with the spatial carrier period or uniform but allows the object to move temporally.

However, these methods are not applicable to cases where the object temporally changes while being spatially nonuniform, or changes drastically. For example, the process from plastic deformation of a material to destruction thereof is nonlinear, so that a temporal and spatial deformation distribution must be measured when determining distortions thereof. However, the above-mentioned two methods are theoretically hard to apply to such measurement.

Dynamic speckle pattern interferometry has been known as an interferometry method effective in a case where object has a rough surface, and such a temporal and spatial fluctuation exists.

Speckle pattern interferometry is an interferometric method utilizing a freckle-like pattern (speckle pattern) occurring in the observation surface of a rough object illuminated by laser light. In typical imaging systems, the speckle pattern is considered unfavorable as image noise. However, it carries phase information, so that deformation can be estimated from changes in the phase information. In addition, the speckle pattern interferometry enables highly accurate deformation measurement with reference to the wavelength of light.

FIG. 9 shows a speckle interferometer of a dual illumination type. An object 100 to be observed, which is a rough surface object, is illuminated with two luminous fluxes 102A, 102B from a laser source 101 arranged substantially symmetrical to each other within the x-z plane. The light fields scattered by the object 100 form an interference speckle pattern on the imaging surface of a CCD camera 103. Thereafter, thus obtained interference speckle pattern image is analyzed, whereby phase analysis is carried out to obtain the surface shape of the object 100.

As the phase analysis technique, subtraction-addition method has been known.

In the phase analysis of speckle pattern images in general, respective speckle patterns before and after the object 100 is deformed are captured, and differences in intensities of corresponding image points therebetween are calculated. The differential intensity approaches zero at places with a stronger correlation, i.e., where the phase change caused by deformation is 0 or an integral multiple of $2\pi$, whereas a greater value of differential intensity is obtained at places with a weaker correlation, whereby a correlation pattern corresponding to the amount of deformation can be obtained if the absolute value of intensity difference $I_{sub}$ between the two images is calculated.

In the above-mentioned subtraction-addition method, information of intensity sum $I_{add}$ is utilized in addition to information of intensity difference $I_{sub}$, whereby a phase is determined independently from the visibility (modulation) $\gamma$.

Here, as shown in FIG. 9, shutters 104A, 104B are placed on the respective optical paths of two luminous fluxes 102A, 102B, so as to measure intensity distributions $I_1(x;t)$, $I_2(x;t)$ of individual image in a temporal domain when the object is illuminated by only one of the luminous fluxes beforehand.

In general, an interference pattern $I(x;t)$ obtained in an optical system (in-plane deformation or out-of-plane deformation system) of a speckle interferometer is represented as in the following expression (7):

$$I(x;t)=I_0(x;t)[1+\gamma(x;t)\cos(\theta(x;t)+\phi(x;t))] \quad (7)$$

where $I_0(x;t)$ is the average intensity of $I_1(x;t)$ and $I_2(x;t)$, $\theta(x;t)$ is a speckle random phase, $\gamma(x;t)$ is the modulation, and $\phi(x;t)$ is the object phase.

Subsequently, letting $I_{before}$ ($t=t_1$) be the intensity before object deformation, and $I_{after}$ ($t=t_2$) be the intensity after object deformation, they are respectively represented as the following expressions (8) and (9):

$$I_{before}=I(x;t_1)=I_0[1+\gamma_m \cos(\theta+\phi_1)] \quad (8)$$

$$I_{after}=I(x;t_2)=I_0[1+\gamma_m \cos(\theta+\phi_2)] \quad (9)$$

The difference $I_{sub}$ and sum $I_{add}$ of these intensity patterns are calculated, while local averages are determined at the same time, as represented by the following expressions (10) and (11):

$$I_{sub}=<|I_{after}-I_{before}|>=$$
$$c<|\sin(\theta+\Delta\phi/2)|><|\sin(\Delta\phi/2)|>\approx c'|\sin(\Delta\phi/2)| \quad (10)$$

$$I_{add}=<|I_{after}+I_{before}-2I_0|>=$$
$$c<|\cos(\theta+\Delta\phi/2)|><|\cos(\Delta\phi/2)|>\approx c'|\cos(\Delta\phi/2)| \quad (11)$$

where < > indicates a local spatial average, whereas c and c' are constants. The average intensity $I_0$ can be determined by a local temporal average. $\Delta\phi=\phi_2-\phi_1$ and indicates the deformation of object between the time $t_1$ and time $t_2$.

The object phase can be determined if the above-mentioned two components are subjected to the arithmetic operation represented by the following expression (12):

$$\Delta\phi = 2\tan^{-1}\frac{I_{sub}}{I_{add}} \quad (12)$$

When the above-mentioned subtraction-addition method is used, however, the absolute value is taken for each of sine and cosine components as represented by the expressions (10) and (11), whereby the phase curve actually obtained for an object phase linearly increasing as shown in FIG. 10 has phase folding points as indicated by a solid line in FIG. 10 though not generating the above-mentioned phase hopping. For this matter, each folding section may be referred as numeral n, so that phases $\phi$ are connected (phase-unwrapped) by using the following expression (13):

$$\phi' = 2\pi\, int\left(\frac{n}{2}\right) + (-1)^{n-1}\phi \quad (13)$$
$$n = 1, 2, 3, 4, \ldots$$

whereby the original object phase $\phi'$ can be restored.

In typical interferometric methods, no absolute values are employed for the sine and cosine components used in the arithmetic operation (e.g., the above-mentioned expression (6)) corresponding to the above-mentioned expression (12) for determining the object phase, whereby the resulting phase exhibits saw-tooth phase hopping as shown in FIG. 11 (or FIG. 8). Since clear discontinuities occur with a phase jump of $2\pi$, a phase connecting operation for restoring the object phase can be executed relatively easily in this case. Namely, it would be more useful if discontinuities are automatically detected (by software), and an offset of an integral multiple of $2\pi$ is added to or subtracted from this section. In the above-mentioned subtraction-addition method, however, peculiar folding of phase occurs as shown in FIG. 10. As a consequence, no discontinuities occur, whereby it is not easy for software to process folded sections automatically. In general, speckle noise is remarkable in speckle pattern interferometry as shown in FIG. 12. In regions where speckle correlation fringes become dense, i.e., where the amount of deformation is large, the phase connecting operation in the subtraction-addition method becomes difficult in particular, whereby automatic processing is likely to impossible in many cases.

Also, as can be seen from the above-mentioned expressions (10) and (11), it is fundamentally essential for the subtraction-addition method to carry out a local spatial average, that degrades the spatial resolution. This makes it further difficult to detect phase folding points, whereby the phase connecting operation becomes quite difficult.

In view of such difficulty in the phase connecting operation of the subtraction-addition method, the inventors proposed an improvement (Japanese Unexamined Patent Publication No. 2001-311613) over this technique, which has raised the accuracy in detecting phase folding points, but has not been able to detect these points automatically yet.

Meanwhile, attention has recently been given to temporal Fourier transform introducing a temporal carrier unlike spatial Fourier transform introducing a spatial carrier. If the temporal Fourier transform method is applied to the above-mentioned speckle pattern interferometry using a signal having a relatively large noise component, however, the above-mentioned signal will be hard to process by automatically determining an optimal band-pass filter therefor.

SUMMARY OF THE INVENTION

In view of the circumstances mentioned above, it is an object of the present invention to provide a deformation measuring method and apparatus which can simplify the detection of phase connecting points in a phase distribution curve to such an extent that it is automated when carrying out phase unwrapping in electronic speckle pattern interferometry as well, thereby being able to analyze dynamic deformation, vibration, distortion, and the like of an object to be observed with a high accuracy.

The present invention provides a deformation measuring method using electronic speckle pattern interferometry, the method comprising the steps of determining a phase change curve of a dynamic object to be observed phase-wrapped in a predetermined phase range by analysis according to a speckle pattern image carrying phase information of the object obtained by using speckle pattern interferometry; and then phase-unwrapping the phase change curve;

wherein, according to a several of speckle pattern images each obtained at a predetermined time, an intensity signal in a temporal domain of each image point is determined, a cosine component of the intensity signal is extracted, thus extracted cosine component is subjected to Hilbert transform in the temporal domain so as to determine a sine component of the intensity signal, and determine a phase change for each image point according to a ratio between thus determined sine and cosine components so as to determine a phase change curve of the object.

In this case, the Hilbert transform is carried out by using the following expression:

$$\hat{F}(t) = H.T. [f(t)] = -\frac{1}{\pi}\int_{-\infty}^{\infty}\frac{f(t')}{t-t'}dt'$$

where t and t' are times, whereas f(t) is a function of time.

Preferably, a phase component ωt introducing a temporal carrier for monotonously increasing or decreasing a phase term of an intensity signal I(x;t) in a temporal domain for each image point is added to or subtracted from the phase term.

For example, the phase component ωt is added or subtracted by causing a piezoelectric device to move a mirror surface of a luminous flux reflecting mirror provided for one of two illumination luminous fluxes for generating speckle pattern interference so as to change an optical path length of this illumination luminous flux.

The deformation measuring method using electronic speckle pattern interferometry in accordance with the present invention is particularly useful when the dynamic object is a test piece subjected to a tensile test.

The present invention provides a deformation measuring apparatus using electronic speckle pattern interferometry for determining a phase change curve of a dynamic object to be observed phase-wrapped in a predetermined phase range by analysis according to a speckle pattern image carrying phase information of the object obtained by using speckle pattern interferometry; and then phase-unwrapping the phase change curve;

the apparatus comprising:

intensity signal calculating means for determining an intensity signal I(x;t) in a temporal domain for each image point according to a plurality of speckle pattern images each obtained for a predetermined time;

average component eliminating means for subtracting a predetermined average intensity signal $I_0(x;t)$ from the intensity signal I(x;t) outputted from the intensity signal calculating means so as to compute a cosine component $I_c(x;t)$ of the intensity signal;

Hilbert transform operating means for subjecting the cosine component of the intensity signal outputted from the average component eliminating means to a Hilbert transform operation in the temporal domain so as to compute a sine component of the intensity signal; and object phase determining means for carrying out an operation for determining an arctangent of a ratio between the cosine component of the intensity signal calculated in the average component eliminating means and the sine component of the intensity signal calculated in the Hilbert transform operating means so as to determine a phase change curve of the object.

The apparatus may further comprise temporal carrier superposing means for superposing an appropriate temporal carrier onto the intensity signal I(x;t). For example, the temporal carrier superposing means is optical path length difference generating means for generating a predetermined optical path length difference between two illumination luminous fluxes for generating speckle pattern interference.

For example, the optical path length difference generating means is a luminous flux reflecting mirror configured such that a mirror surface thereof is movable with a piezoelectric device.

BRIEF DESCRIPTION OF THE DRAWINGS

FIG. 5 is a block diagram showing individual means included in a computer of the apparatus in accordance with the above-mentioned embodiment of the present invention;

DESCRIPTION OF THE PREFERRED EMBODIMENTS

In the following, an embodiment of the deformation measuring method using electronic speckle pattern interferometry in accordance with the present invention will be explained with reference to the drawings.

Basic Configuration

Figure 1:
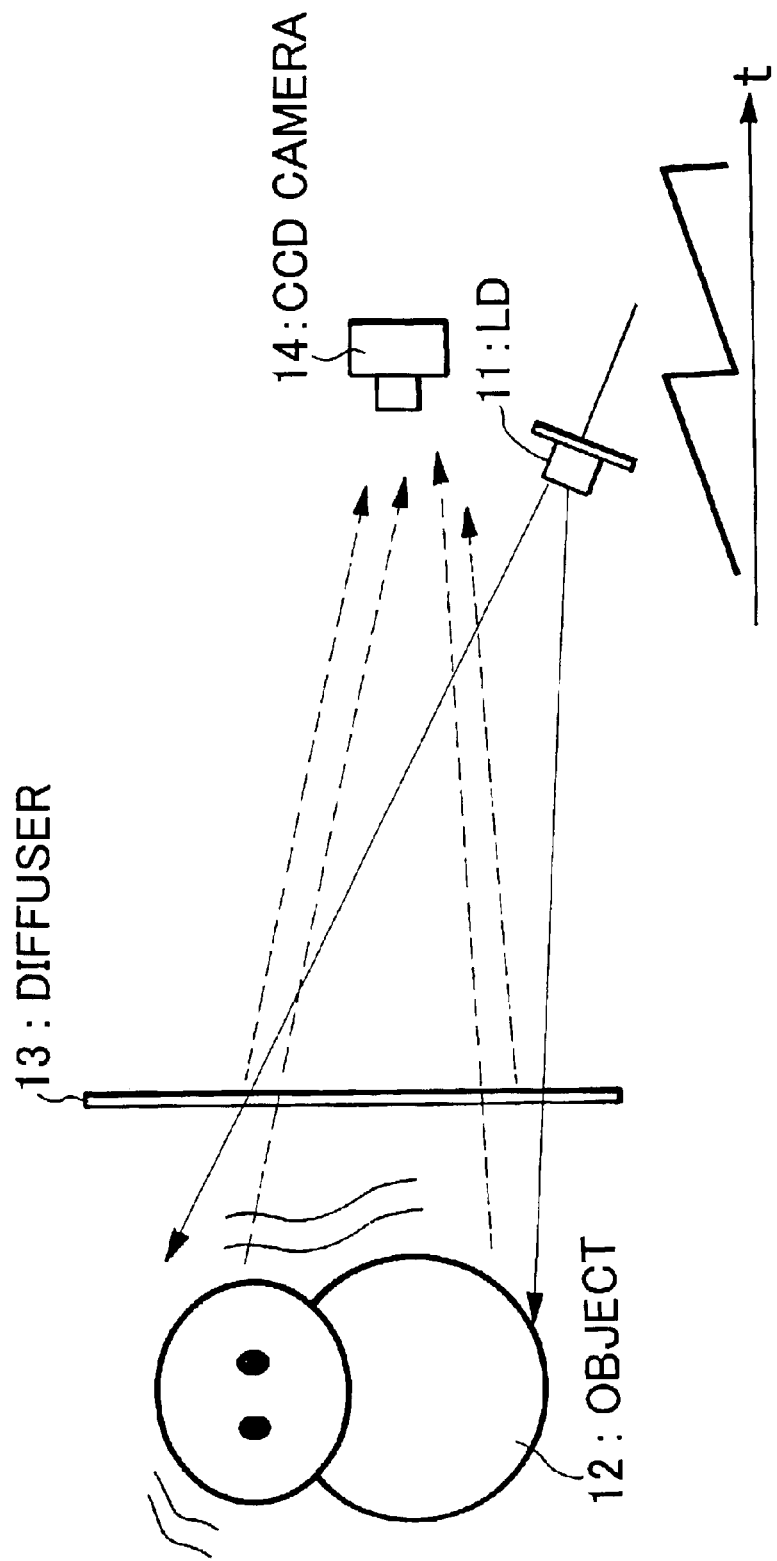
FIG. 1 is a schematic view showing an example of out-of-plane displacement speckle interferometry measuring optical system for explaining the concept of the method in accordance with the present invention.
Figure 2:
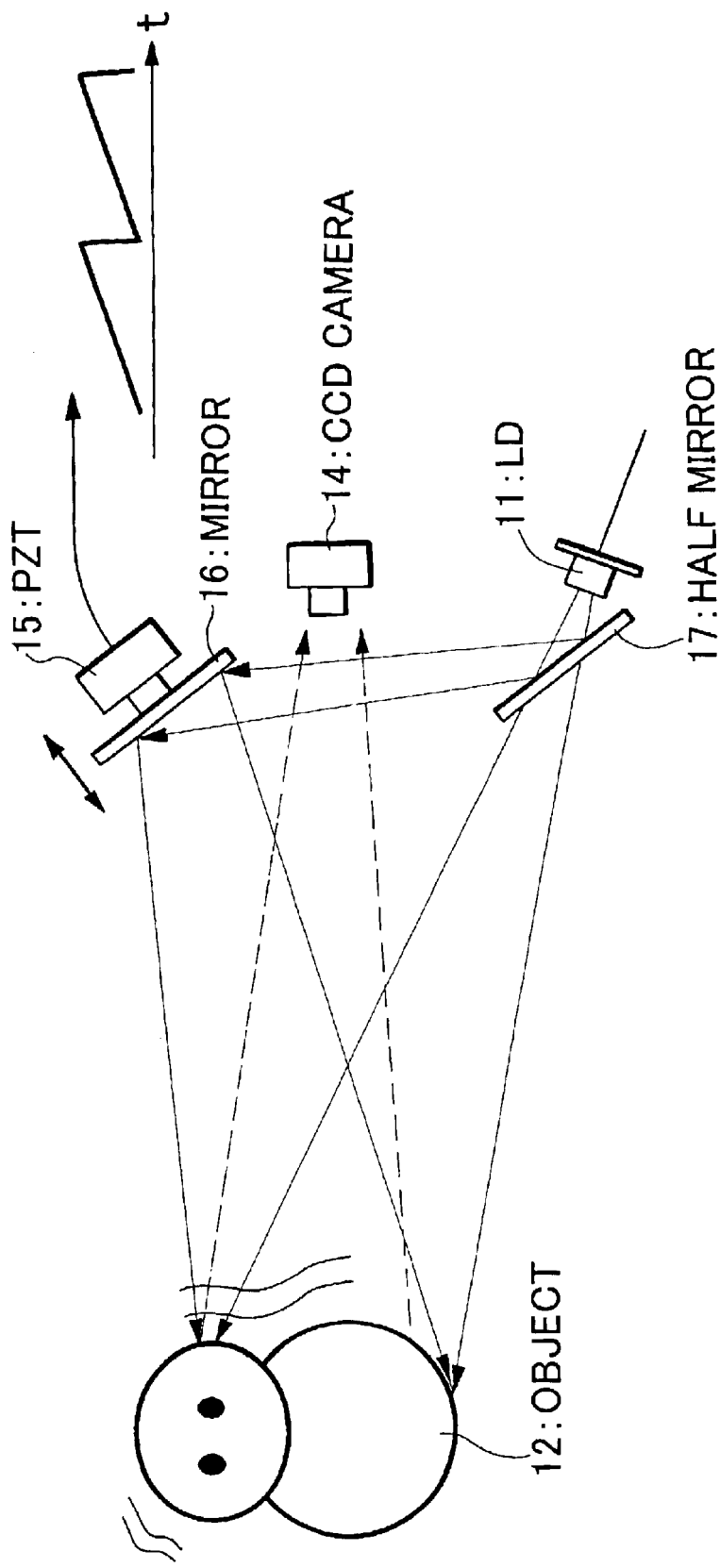
FIG. 2 is a schematic view showing an example of in-plane displacement speckle interferometry measuring optical system for explaining the concept of the method in accordance with the present invention.

FIGS. 1 and 2 show respective examples of optical systems for measuring out-of-plane and in-plane displacements of an object to be observed by using speckle pattern interferometry.

In the interference optical system apparatus for measuring out-of-plane displacement shown in FIG. 1, laser light emitted from a semiconductor laser light source (LD) 11 is partly scattered by a diffuser 13 arranged in front of an object 12 to be observed, so as to form a speckle pattern. On the other hand, the part of laser light transmitted through the diffuser 13 illuminates the object 12 and is scattered by the surface thereof, so as to form a speckle pattern in a manner similar to that mentioned above. These two scattered light components form an image of a random interference speckle pattern on the imaging surface of a CCD camera 14, which photoelectrically reads out this interference pattern. In the interference optical system apparatus for measuring in-plane displacement shown in FIG. 2, on the other hand, the object 12 is illuminated with two laser light beams substantially symmetrical to each other about a normal of the object which are split by a half mirror 17, so that speckle patterns independent from each other are formed, whereby an image of an interference speckle pattern is formed on the imaging surface of a CCD camera 14 due to the interference of these two speckle patterns. Thereafter, this interference speckle pattern is photoelectrically read out in a manner similar to that mentioned above. PZT 15 will be explained later.

In each of the apparatus mentioned above, the intensity I(x;t) of the random interference pattern detected by the CCD camera 14 is represented as the following expression (14):

$$I(x;t)=I_0(x;t)[1+\gamma(x;t)\cos(\theta(x;t)+\phi(x;t))] \qquad (14)$$

where x is a coordinate, t is the time, $I_0(x;t)$ is the average intensity, $\gamma(x;t)$ is the degree of modulation, $\theta(x;t)$ is the random speckle phase, and $\phi(x;t)$ is the object phase accompanying the displacement of the object to be observed.

This embodiment aims at determining the object phase $\phi(x;t)$ with a high accuracy.

Therefore, in this embodiment, the average intensity $I_0(x;t)$ is initially determined by local temporal averaging with respect to the intensity in the above-mentioned expression (14), and then is subtracted from the interference pattern intensity I(x;t), so as to take out only the cosine component of interference pattern intensity. Letting $I_c(x;t)$ be thus taken-out component, it can be represented as the following expression (15):

$$I_c(x;t)=I(x;t)-I_0(x)\approx I(x;t)-\langle I(x;t)\rangle_t \propto \cos(\theta(x;t)+\phi(x;t)) \qquad (15)$$

Subsequently, the temporal signal represented by the above-mentioned expression (15) is subjected to Hilbert transform.

The Hilbert transform with respect to a function f(t) is defined by the following expression (16):

$$\hat{F}(t) = H.T.[f(t)] = -\frac{1}{\pi}\int_{-\infty}^{\infty}\frac{f(t')}{t-t'}dt' \qquad (16)$$

By subjecting the cosine component of the above-mentioned expression (15) to Hilbert transform, the sine component represented by the following expression (17):

$$I_s(x;t)=H.T.[I_c(x;t)] \propto \sin(\theta(x;t)+\phi(x;t)) \qquad (17)$$

is obtained.

The ratio between the above-mentioned cosine component $I_c(x;t)$ and sine component $I_s(x;t)$, and the arctangent of this ratio is determined, whereby the object phase is determined as the following expression (18):

$$\theta(x;t) + \phi(x;t) = \tan^{-1}\left[\frac{I_s[x;t]}{I_c[x;t]}\right] \qquad (18)$$

Normally, the change in speckle random phase $\theta(x;t)$ is slower than the change in object phase, whereby it can be approximated as in the following expression (19):

$$\theta(x;t)\approx\theta(x;0) \qquad (19)$$

Therefore, the target object phase is determined as in the following expression (20):

$$\phi(x;t) \cong \tan^{-1}\left[\frac{I_s[x;t]}{I_c[x;t]}\right] - \theta(x;0) \qquad (20)$$

When the observation time $t_0$ is so long that expression (19) does not hold, the total observation period $t_0$ is divided into n sections with a shorter period $t_d$ ($t_0=nt_d$) in which the speckle phase can be considered constant, and the object phase is determined in each section by substituting $\theta(x;0)$ with $\theta(x;kt_d)$, k=0, 1, . . . , n−1. Namely, the reference phase is updated as appropriate. Finally, the individual sections are connected together, whereby a dynamic phenomenon over a long period of time can be analyzed.

Thus determined phase curve in the temporal domain is in a state whose phase value is wrapped (folded) within −π and π as principal values as mentioned above. Therefore, thus wrapped (folded) phase curve is subjected to phase-unwrapping for restoring it to the original curve.

By carrying out the foregoing arithmetic operation for each image point on the speckle pattern interference image, deformation of the object to be observed can be analyzed by quantifying it dynamically with a high accuracy.

Determination of Polarity of Phase Term

Meanwhile, in the explanation of principle mentioned above, uncertainty occurs in the polarity of phase term as can be seen from expression (15). For eliminating this uncertainty, a known phase component ωt is intentionally introduced into the phase term of expression (15). Namely, a phase component ωt determined such that θ(x;t)+φ(x;t)+ωt, which is the phase term in the following expression (21), monotonously increases or decreases is introduced as so-called temporal carrier component.

$$I(x;t)=I_0(x;t)[1+\gamma(x;t)\cos(\theta(x;t)+\phi(x;t)+\omega t)] \quad (21)$$

Specifically, it can be carried out by various known techniques, for example, such as one modulating the current injected to the semiconductor laser light source 11 as shown in FIG. 1 and one changing the optical path length by moving the mirror 16 with the piezoelectric transducer (PZT) 15 as shown in FIG. 2.

Apparatus Configuration

Figure 3:
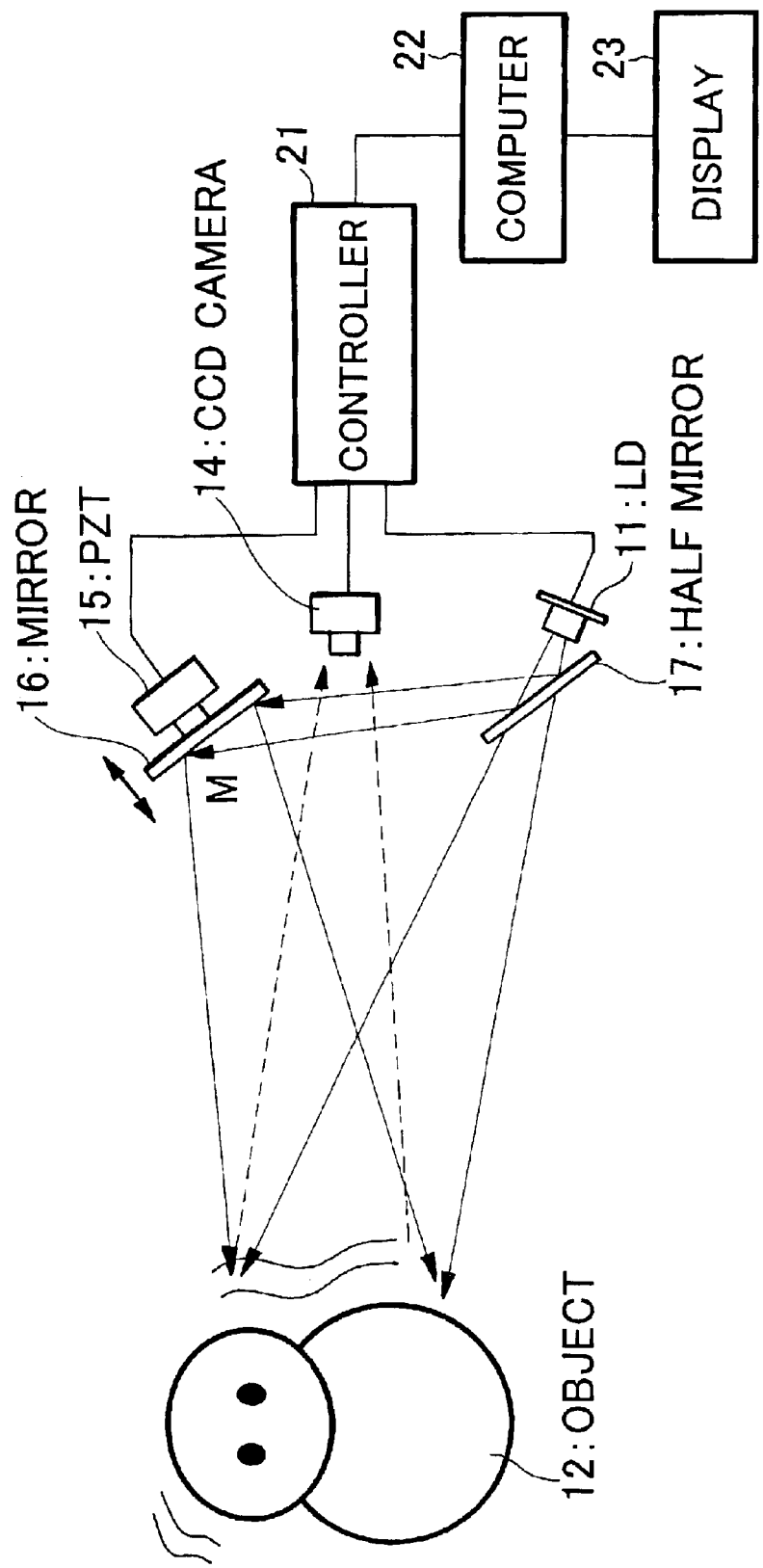
FIG. 3 is a schematic view showing the configuration of the apparatus in accordance with an embodiment of the present invention.

FIG. 3 is a schematic diagram showing a deformation measuring apparatus using electronic speckle pattern interferometry in accordance with an embodiment of the present invention. This apparatus is an example of apparatus for carrying out in-plane displacement measurement of an object to be observed.

As explained in FIG. 2, the object 12 to be observed is illuminated with two laser light beams, substantially symmetrical to each other with respect to a normal of the object, split by the half mirror 17, whereby random speckle patterns are formed independently from each other due to scattering of the two laser light beams from the object 12. The interference between these two speckle patterns forms an interference pattern on the imaging surface of the CCD camera 14. Here, the piezoelectric transducer (PZT) 15 is used for changing the optical path length of one of the systems of the interferometer in order to introduce the above-mentioned temporal carrier component. The piezoelectric transducer 15, CCD camera 14, and semiconductor laser light source (LD) 11 are under the control of a timing controller 21, whereby the image data of interference pattern captured by the CCD camera 14 is stored into a memory within a computer 22. In the computer 22, the image data is subjected to phase analysis processing using Hilbert transform, so as to obtain information items such as the amount of distortion of the object. Thus obtained information items concerning the object are shown on a display 23.

Figure 4:
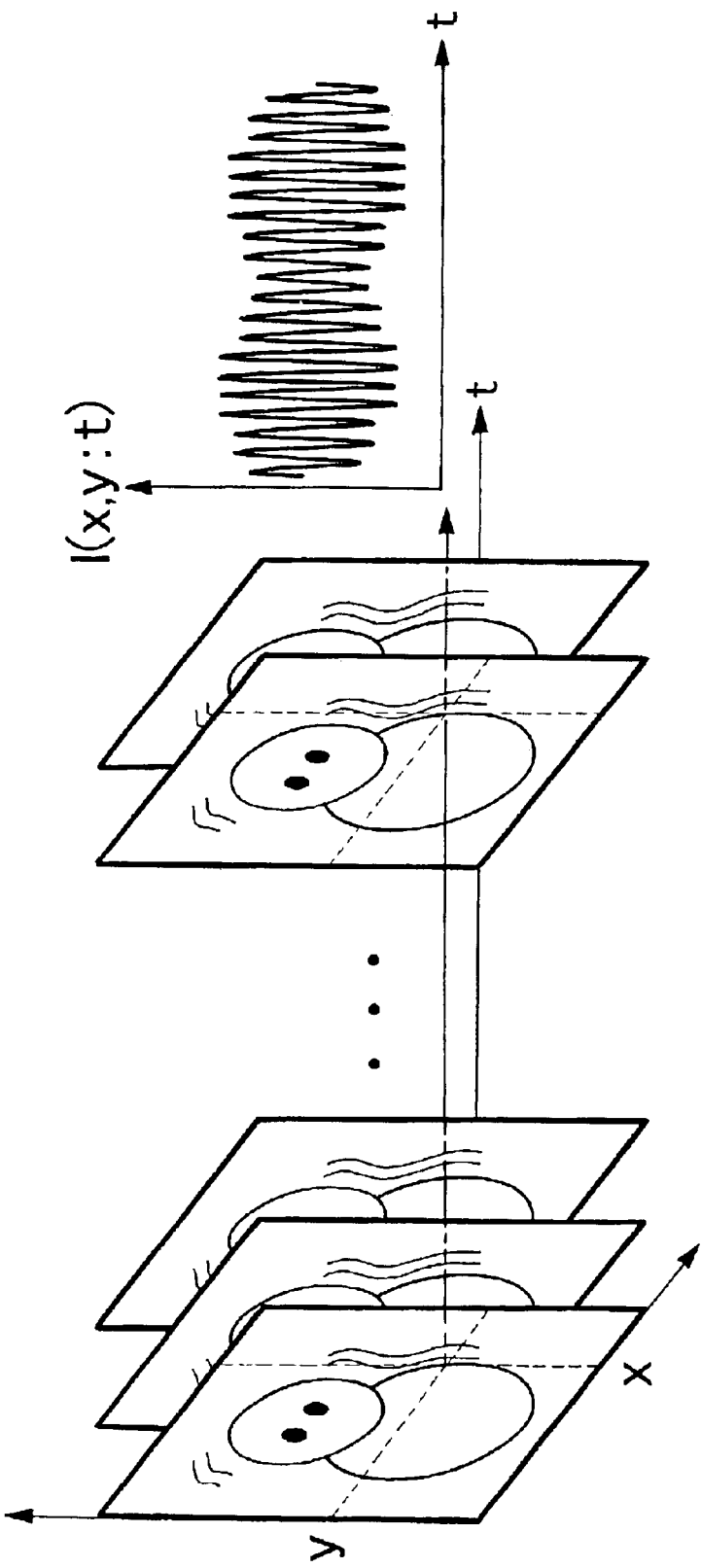
FIG. 4 is a view conceptually showing interference pattern images taken into the apparatus in accordance with the above-mentioned embodiment of the present invention.

The speckle pattern images are captured at predetermined intervals as shown in FIG. 4, whereby the temporal change of intensity I(x,y;t) is obtained at each image point within the images (see the graph at the right end of FIG. 4).

Here, the intensity I(x,y;t) at one point (x,y) within the images is represented by the following expression (22):

$$I(x,y;t)=I_0(x,y;t)[1+\gamma(x,y;t)\cos(\theta_i(x,y;t)+\phi(x,y;t)+\omega t)] \quad (22)$$

where ωt is the temporal carrier component; ω=0 when this component is not introduced.

As shown in the block diagram of FIG. 5, the arithmetic operations in the computer 22 are sequentially carried out in an average component eliminating means 32, a Hilbert transform operating means 33, an object phase deriving means 34, and a phase connecting means 35 with respect to the intensity I(x,y;t) (hereinafter simply referred to as I(x;t)) as the input signal.

Here, the intensity I(x;t) is one in which an appropriate carrier component is introduced thereon by temporal carrier introducing means such as PZT mentioned above.

The inputted intensity I(x;t) is initially subjected to an arithmetic operation for eliminating the average intensity $I_0(x;t)$ by using the above-mentioned expression (15) in the average component eliminating means 32.

The Hilbert transform operating means 33 computes the sine component by Hilbert transform using the above-mentioned expression (17).

The object phase deriving means 34 carries out an arithmetic operation for determining the arctangent of the ratio between the cosine and sine components by using the above-mentioned expression (18), and then determines the object phase by using the above-mentioned expression (20).

Thereafter, the phase connecting means 35 carries out an unwrapping operation for the object phase curve, thereby determining dynamic deformation information of the object. Namely, as mentioned above, phase-hopping positions of the phase curve are determined, and a phase value of 2π is added to (or subtracted from) the data on the right side of each of thus determined positions, so as to correct the phase hopping, thereby yielding a phase distribution in proportion to the deformation of object.

Figure 6B:
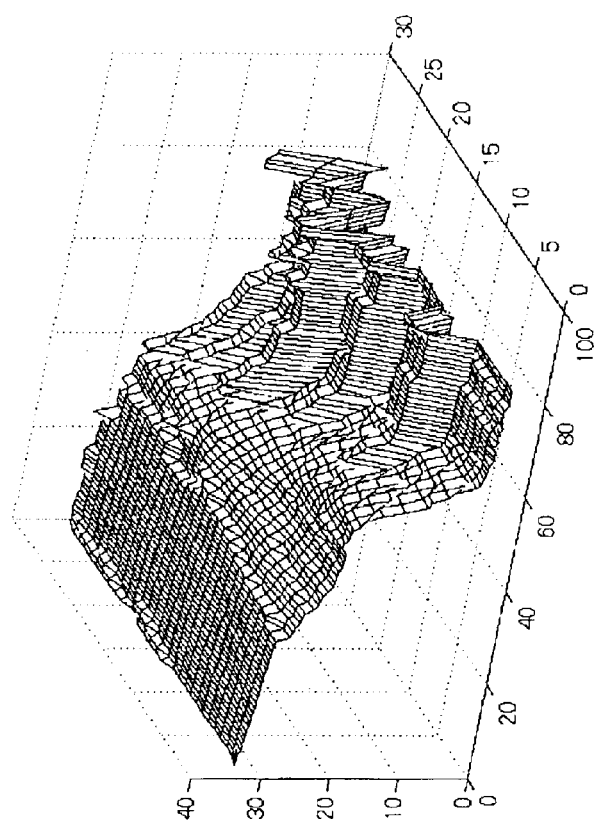
FIGS. 6A and 6B are charts showing results of analysis of a phase distribution caused by in-plane deformation of an object to be observed in Example and Comparative Example, respectively.
Figure 6A:
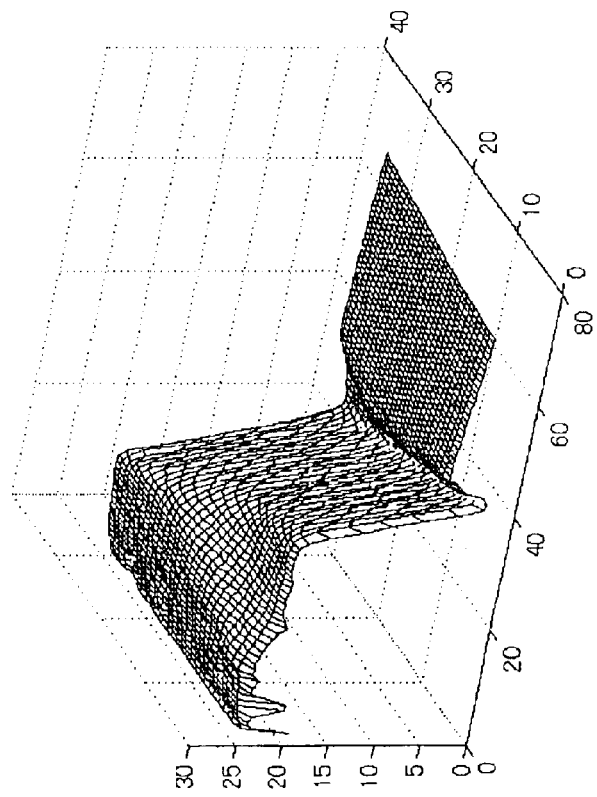

Finally, a three-dimensional deformation distribution forming means 36 yields a three-dimensional deformation distribution such as the one shown in FIG. 6A from the phase curve obtained after the phase unwrapping operation for each image point, and its data is outputted after being converted into a mode which can be represented on the display 23 three-dimensionally.

The above-mentioned means 32 to 36 are constructed by programs stored in the computer 22.

Since the method of the present invention is particularly effective when employed in deformation measurement for carrying out a tensile test (or fatigue test) of a material, for example, effects obtained when the method of the present invention is applied to a process of analyzing temporally changing deformation of an aluminum alloy in a tensile test thereof will now be explained with reference to specific examples.

EXAMPLES

Figure 7A:
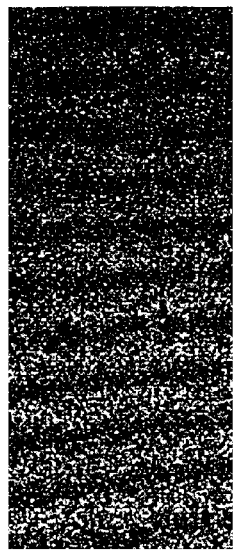
FIGS. 7A to 7J are views showing deformation distributions observed by a conventional electronic speckle pattern interferometry (ESPI) method in the case where a material such as an aluminum alloy is pulled.
Figure 7B:
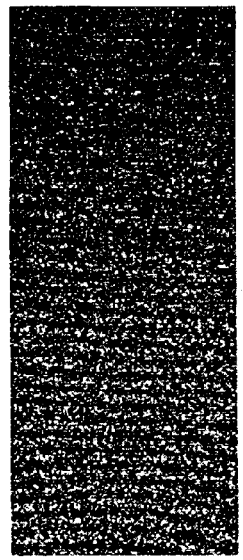
Figure 7C:
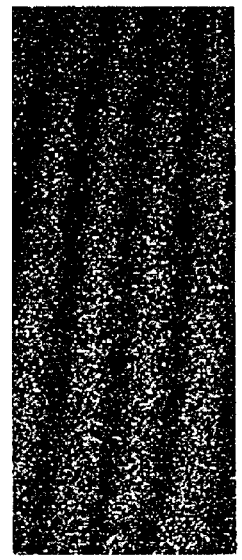
Figure 7D:
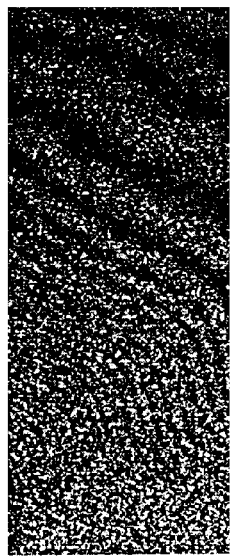
Figure 7E:
Figure 7F:
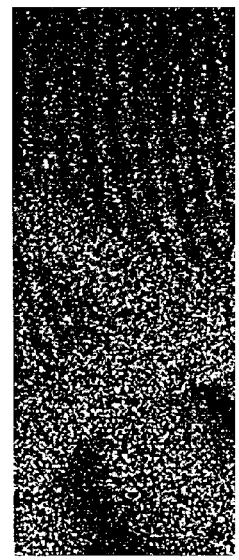
Figure 7G:
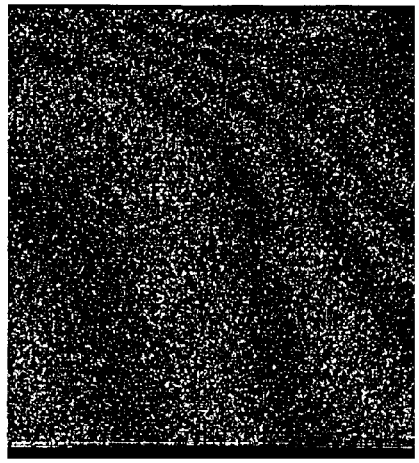
Figure 7H:
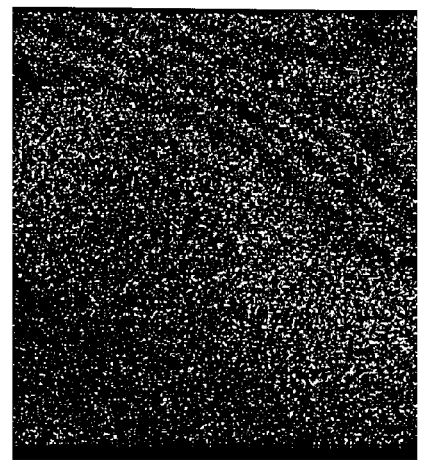
Figure 7I:
Figure 7J:
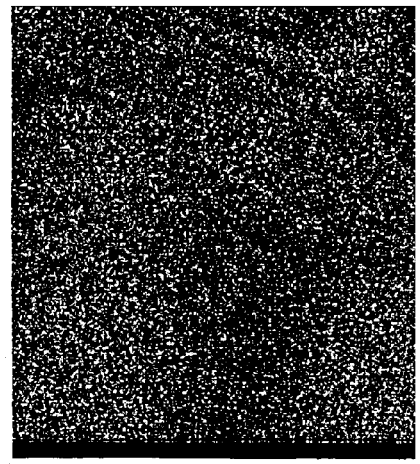
Figure 8:
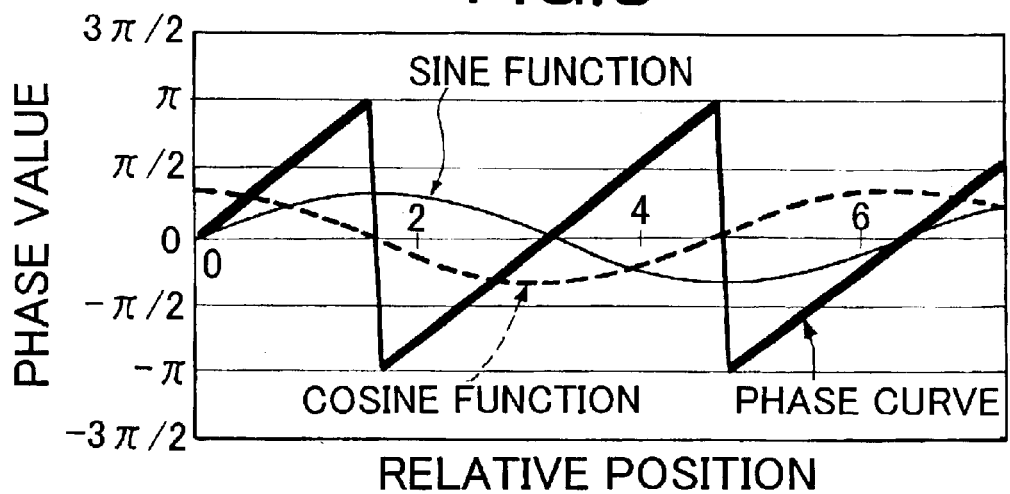
FIG. 8 is a graph showing a phase wrapping curve for linearly increasing object phase.
Figure 9:
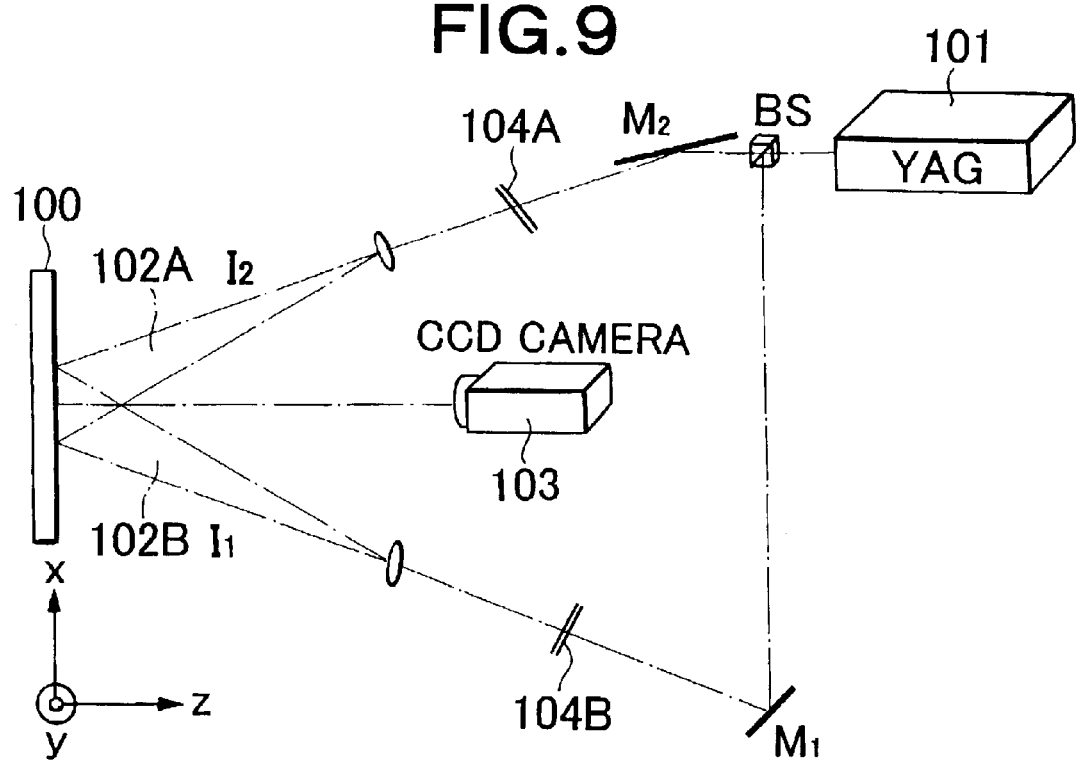
FIG. 9 is a schematic view showing a speckle interferometer (measurement optical system) of a dual luminous flux irradiation type.
Figure 10:
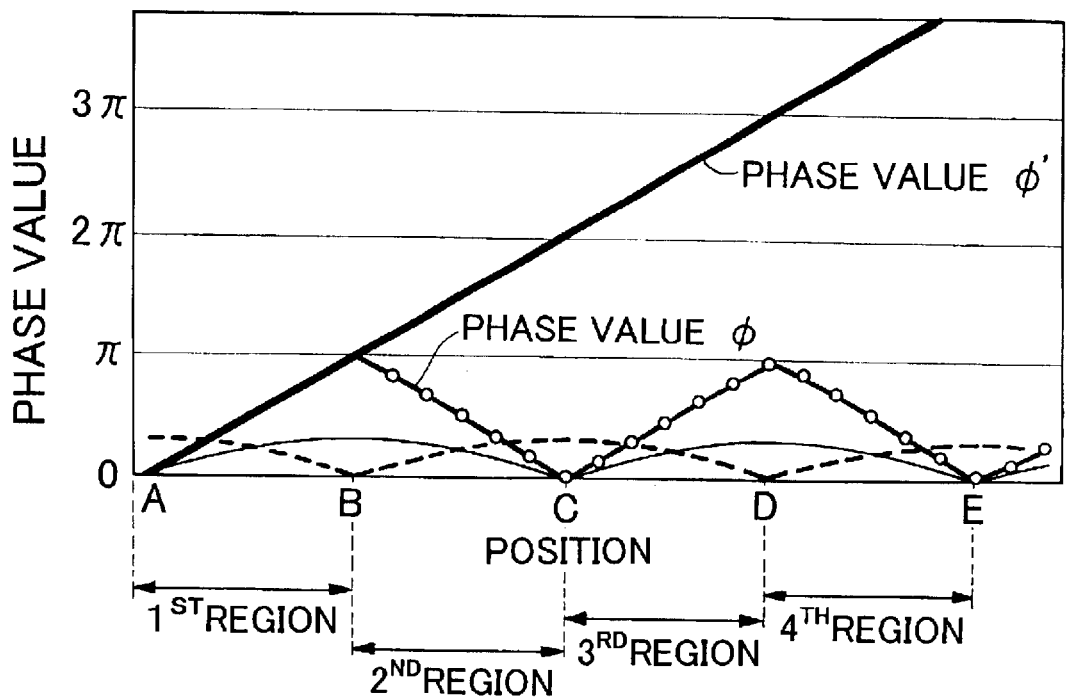
FIG. 10 is a chart showing a phase folding state in the subtraction-addition method.
Figure 11:
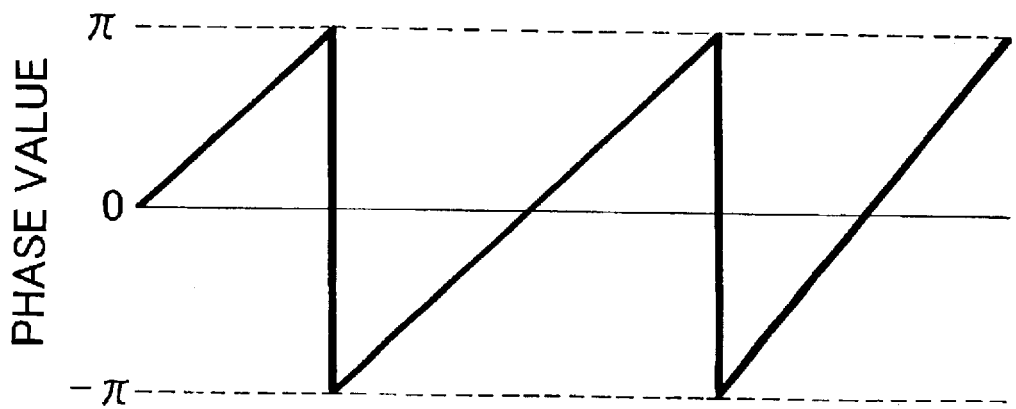
FIG. 11 is a chart showing a phase folding state in a typical interferometry method.
Figure 12:
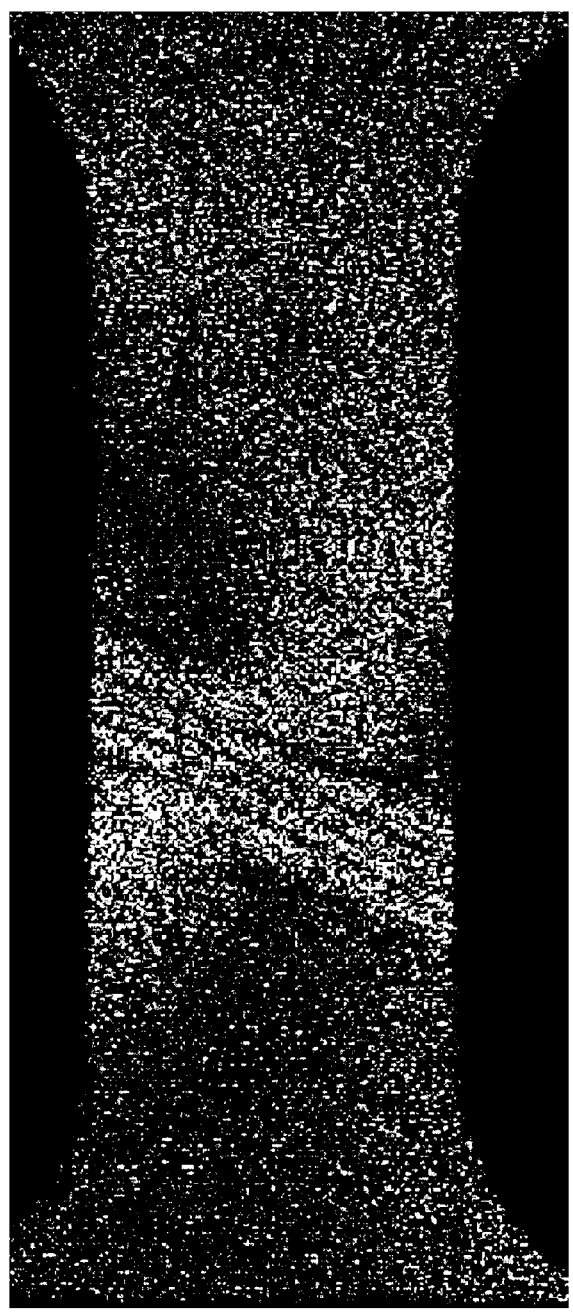
FIG. 12 is a view showing speckle noise in an image obtained by speckle interferometry.

In general, when a material such as an aluminum alloy is pulled, uniform stretches occur in the elastic deformation area thereof. When they are observed by electronic speckle pattern interferometry (ESPI), uniform fringes such as those shown in FIGS. 7A to 7C are seen. The direction and density of fringes vary depending on the position due to the fact that rotations are caused by unexpected installation errors of the test piece and the like in addition to the deformation. If the deformation exceeds the yield point, thereby reaching the plastic deformation area, the deformation will be localized in a narrow region tilted by about 45° with respect to the pulling direction, which is known as slip band, in general. When it is observed by electronic speckle pattern interferometry (ESPI), fringes are concentrated in the localized part as shown in FIGS. 7D to 7F.

Further, when observed with a relatively long differential time for the rate of deformation, a band-like part in which an inner fringe structure seems to have disappeared emerges and moves up and down at a substantially constant speed. When a sufficiently short differential time is taken for this part, a fringe structure appears. When this part is observed in detail under magnification, it can be seen that local deformation develops nonlinearly in a complicated manner as shown in FIGS. 7G to 7J (observed at intervals of 3.6 seconds from FIGS. 7G to 7J). Such a conventional speckle pattern interferometry method (ESPI) can qualitatively grasp temporal changes of deformation but cannot quantitatively determine the magnitude of deformation.

When the method of the present invention is applied to the processing for analyzing the deformation, by contrast, the magnitude of deformation can quantitatively be grasped with a high accuracy in a simple manner even when the S/N ratio is relatively low.

Using the apparatus of the above-mentioned embodiment, a phase distribution caused by in-plane deformation of an object to be observed was analyzed under the following experimental condition. FIG. 6A shows the results.

The results obtained by using the above-mentioned subtraction-addition method under the same condition are shown in FIG. 6B as a comparative example.

(1) Experimental Condition
Object: aluminum alloy (with a thickness of 5 mm)
Pulling rate: 0.5 μm/sec
Observation area: 80 mm×30 mm
Frame rate: 30 frames/sec
Illumination light: semiconductor laser light
Illumination light wavelength: 532 nm (2) Experimental Results
As can be seen when FIGS. 6A and 6B are compared with each other, the subtraction-addition method yielded quite erroneous analysis data since the phase connection could not be carried out correctly, whereas the magnitude of deformation could be obtained accurately when the method of the present invention was used.

Comparison with Cases Using Other Techniques

As mentioned above, various problems occur when other techniques are used in place of the method of the present invention in the case where deformation of an object to be observed in a temporal domain is measured by using electronic speckle pattern interferometry.

Namely, it is difficult for phase-shifting or spatial Fourier transform method to handle a speckle pattern which changes temporally and spatially. On the other hand, it is difficult for temporal Fourier transform method to automatically determine an optimal band-pass filter for a signal having a low S/N ratio in speckle pattern interferometry. It is difficult for the subtraction-addition method to find out the phase folding points, so that automatic processing is impossible in many cases, whereby only quite erroneous analysis results can be obtained as shown in the above-mentioned comparative example except for cases with favorable data acquiring conditions.

When the method of the present invention is used, by contrast, favorable analysis results can be obtained without the fear of generating problems such as those of the above-mentioned conventional techniques.

Modification of Embodiment

The method in accordance with the embodiment of the present invention can be modified in various manners. For example, unwrapped phase data may be subjected to smoothing by use of a low-pass filter or median filtering.

The present invention can be applied to dynamic objects in general. For example, it is applicable not only to fatigue tests of materials in general including items such as the above-mentioned tensile test of materials, but also to minute dynamic changes of various constituent parts of animals and plants, such as human tissues in particular.

As explained in detail in the foregoing, the deformation measuring method and apparatus using electronic speckle pattern interferometry in accordance with the present invention extracts the cosine component of the interference speckle pattern intensity of the object to be observed, subjects thus extracted cosine component to Hilbert transform in a time domain so as to determine the sine component of the intensity, and determine the phase at each image point according to thus determined sine and cosine components, thereby yielding a phase distribution curve of the object.

Therefore, a phase distribution curve can easily be determined even in an object which changes temporally and spatially, while phase connecting points can easily be specified even from a signal including a large amount of noise typical in speckle pattern interferometry, so that automation is possible, whereby quite highly accurate analysis results can be obtained.

What is claimed is:

1. A deformation measuring method using electronic speckle pattern interferometry, said method comprising the steps of determining a phase change curve of a dynamic object to be observed phase-wrapped in a predetermined phase range by analysis according to a speckle pattern image carrying phase information of said object obtained by using electronic speckle pattern interferometry; and then phase-unwrapping said phase change curve;

wherein, according to a plurality of speckle pattern images each obtained at a predetermined time, an intensity signal in a temporal domain of each image point is determined, a cosine component of said intensity signal is extracted, thus extracted cosine component is subjected to Hilbert transform in said temporal domain so as to determine a sine component of said intensity signal; and determine a phase change for each image point according to a ratio between thus determined sine and cosine components so as to determine a phase change curve of said object.

2. A deformation measuring method according to claim 1, wherein said Hilbert deformation is carried out by using the following expression:

$$\hat{F}(t) = H.T.[f(t)] = -\frac{1}{\pi}\int_{-\infty}^{\infty}\frac{f(t')}{t-t'}dt'$$

where t and t' are times, whereas f(t) is a function time.

3. A deformation measuring method according to claim 1, wherein a phase component ωt introducing a temporal carrier for monotonously increasing or decreasing a phase term of an intensity signal I(x;t) in a temporal domain for each image point is added to or subtracted from said phase term.

4. A deformation measuring method according to claim 3, wherein said phase component ωt is added or subtracted by causing a piezoelectric transducer to move a mirror surface of a luminous flux reflecting mirror provided for one of two illumination luminous fluxes for generating speckle pattern interference so as to change an optical path length of said one illumination luminous flux.

5. A deformation measuring method according to claim 1, wherein said dynamic object is a test piece subjected to a tensile test.

6. A deformation measuring apparatus using electronic speckle pattern interferometry for determining a phase change curve of a dynamic object to be observed phase-wrapped in a predetermined phase range by analysis according to a speckle pattern image carrying phase information of said object obtained by using speckle pattern interferometry; and then phase-unwrapping said phase change curve;

said apparatus comprising:

intensity signal calculating means for determining an intensity signal I(x;t) in a temporal domain for each image point according to a plurality of speckle pattern images each obtained for a predetermined time;

average component eliminating means for subtracting a predetermined average intensity signal $I_0(x;t)$ from said intensity signal I(x;t) outputted from said intensity signal calculating means so as to compute a cosine component $I_c(x;t)$ of said intensity signal;

Hilbert transform operating means for subjecting said cosine component of said intensity signal outputted from said average component eliminating means to a Hilbert transform operation in said temporal domain so as to compute a sine component of said intensity signal; and object phase determining means for carrying out an operation for determining an arctangent of a ratio between said cosine component of said intensity signal calculated in said average component eliminating means and said sine component of said intensity signal calculated in said Hilbert transform operating means so as to determine a phase change curve of said object.

7. A deformation measuring apparatus according to claim 6, further comprising temporal carrier superposing means for superposing an appropriate temporal carrier onto the intensity signal I(x;t), said temporal carrier superposing means comprising optical path length difference generating means for generating a predetermined optical path length difference between two illumination luminous fluxes for generating speckle pattern interference.

8. A deformation measuring apparatus according to claim 7, wherein said optical path length difference generating means is a luminous flux reflecting mirror configured such that a mirror surface thereof is movable with a piezoelectric device.

* * * * *

UNITED STATES PATENT AND TRADEMARK OFFICE
CERTIFICATE OF CORRECTION

PATENT NO.    : 6,943,870 B2
DATED         : September 13, 2005
INVENTOR(S)   : Satoru Toyooka and Hirofumi Kadono It is certified that error appears in the above-identified patent and that said Letters Patent is hereby corrected as shown below:

Column 12,
Line 24, delete ";" and substitute therefore -- , --.
Line 36, after "function" insert -- of --.

Signed and Sealed this

Twenty-ninth Day of November, 2005

JON W. DUDAS
*Director of the United States Patent and Trademark Office*